United States Patent
Zhou et al.

(10) Patent No.: US 11,175,436 B2
(45) Date of Patent: Nov. 16, 2021

(54) DYE-DOPED LASER PROTECTIVE FILM

(71) Applicants: South China Normal University, Guangzhou (CN); Shenzhen Guohua Optoelectronics Co., Ltd., Shenzhen (CN); Academy of Shenzhen Guohua Optoelectronics, Shenzhen (CN)

(72) Inventors: Guofu Zhou, Guangzhou (CN); Xiaowen Hu, Guangzhou (CN); Wei Zhao, Guangzhou (CN); Haitao Sun, Guangzhou (CN); Qiumei Nie, Guangzhou (CN)

(73) Assignees: South China Normal University, Guangzhou (CN); Shenzhen Guohua Optoelectronics Co., Ltd., Shenzhen (CN); Academy of Shenzhen Guohua Optoelectronics, Shenzhen (CN)

( * ) Notice: Subject to any disclaimer, the term of this patent is extended or adjusted under 35 U.S.C. 154(b) by 0 days.

(21) Appl. No.: 16/499,035

(22) PCT Filed: Oct. 10, 2018

(86) PCT No.: PCT/CN2018/109637
§ 371 (c)(1),
(2) Date: Sep. 27, 2019

(87) PCT Pub. No.: WO2019/196364
PCT Pub. Date: Oct. 17, 2019

(65) Prior Publication Data
US 2020/0041701 A1    Feb. 6, 2020

(30) Foreign Application Priority Data
Apr. 11, 2018 (CN) .......................... 201810320875.8

(51) Int. Cl.
*G02B 5/00* (2006.01)
*C08F 222/20* (2006.01)
(Continued)

(52) U.S. Cl.
CPC ............ *G02B 5/003* (2013.01); *C08F 222/20* (2013.01); *C08J 7/0427* (2020.01); *C08K 5/08* (2013.01);
(Continued)

(58) Field of Classification Search
CPC .. G02B 5/00–32; G02B 1/00–18; C09B 1/00; C08K 5/08; C08K 5/103; C08F 222/102; C08F 222/20
See application file for complete search history.

(56) References Cited

U.S. PATENT DOCUMENTS

2007/0165687 A1    7/2007    Takezoe et al.
2012/0081653 A1*   4/2012    Oki .................... G02B 5/0891
                                                             349/195
(Continued)

FOREIGN PATENT DOCUMENTS

| CN | 101291804 A | 10/2008 |
| CN | 102037565 A | 4/2011 |

(Continued)

OTHER PUBLICATIONS

Zhang et al. Unconventional High-Performance Laser Protection System Based on Dichroic Dye-Doped Cholesteric Liquid Crystals, Nature: Scientific Reports, 7:42955, (Feb. 2017); pp. 1-3.*
(Continued)

*Primary Examiner* — Prashant J Khatri
(74) *Attorney, Agent, or Firm* — Christopher & Weisberg, P.A.

(57) ABSTRACT

A dye-doped laser protective film is disclosed, comprising a polymer layer A and a polymer layer B. The polymer
(Continued)

molecules in the polymer layer A are arranged in a left-handed helical structure which can reflect a left-handed polarized laser. The polymer molecules in the polymer layer B are arranged in a right-handed helical structure which can reflect a right-handed polarized laser. The combination of the polymer layer having the left-handed helical structure and the polymer layer having the right-handed helical structure can completely reflect circularly polarized light. In addition, the dye can absorb incident laser, so as to expand the protection angle of the laser protective film. The dye-doped laser protective film of the present disclosure has a simple manufacturing process, large protection angle and good flexibility, and can refit existing devices. Thus, the dye-doped laser protective film of the present disclosure has a good application prospect in many fields such as laser goggles, window films and the like.

8 Claims, 1 Drawing Sheet

(51) Int. Cl.
    *C08K 5/08*       (2006.01)
    *C08K 5/103*      (2006.01)
    *C09B 1/00*       (2006.01)
    *G02B 1/04*       (2006.01)
    *C08J 7/04*       (2020.01)

(52) U.S. Cl.
    CPC ............ *C08K 5/103* (2013.01); *C09B 1/00* (2013.01); *G02B 1/04* (2013.01); *C08F 2800/20* (2013.01); *C08J 2335/02* (2013.01); *C08J 2435/02* (2013.01)

(56) References Cited

U.S. PATENT DOCUMENTS

2014/0284582 A1* 9/2014 Saitoh ............... G02B 5/3016
                                                    257/40
2016/0252755 A1   9/2016 Lavrentovich et al.
2017/0285235 A1* 10/2017 Hayasaki ............ G02B 5/305

FOREIGN PATENT DOCUMENTS

| CN | 102782572 A | 11/2012 |
| CN | 105759529 A | 7/2016 |
| CN | 106483730 A | 3/2017 |

OTHER PUBLICATIONS

"[3-methyl-4-[4-(3-prop-2-enoyloxypropoxy)benzoyl]oxyphenyl] 4-(3-prop-2-enoyloxypropoxy)benzoate", MolBase, Retrieved Oct. 14, 2020.*

Tondiglia et al. "Electrically induced bandwidth broadening in polymer stabilized cholesteric liquid crystals", Journal of Applied Physics, 110, 053109 (2011); pp. 053109.1-053109.8.*

"Tinuvin(R) 328". BASF, (2010); pp. 1-3.*

Khandelwal et al. "Application of broadband infrared reflector based on cholesteric liquid crystal polymer bilayer film to windows and its impact on reducing the energy consumption in buildings", Journal of Materials Chemistry A, (2014); pp. 14622-14627.*

"Ciba® IRGACURE® 819". Ciba Specialty Chemicals, (2001); pp. 1-3.*

"Ciba® IRGACURE® 651". Ciba Specialty Chemicals, (2001); pp. 1-3.*

Haito et al., "Laser Protective Device Based on Liquid Crystalline Polymer," Journal of South China Normal University (Natural Science Edition), 2018, vol. 50, No. 1, pp. 49-54; consisting of 6 pages.

* cited by examiner

Dichroic dye

Incident laser
left-handed polarized light
right-handed polarized light
Dichroic dye

DYE-DOPED LASER PROTECTIVE FILM

CROSS-REFERENCE TO RELATED APPLICATIONS

This application is a Submission under 35 U.S.C. § 371 for U.S. National Stage Patent Application of, and claims priority to, International Application Number PCT/CN2018/109637, entitled DYE-DOPED LAZER PROTECTIVE FILM filed Oct. 10, 2018, which International Application is related to and claims priority to Chinese Application No. 201810320875.8 filed Apr. 11, 2018, the entirety of all of which are incorporated herein by reference.

TECHNICAL FIELD

The present disclosure relates to the technical field of laser protection, and more particularly to a dye-doped laser protective film.

BACKGROUND

Laser has properties such as high optical power density and good collimation, but may cause damage to eyes and precision optical equipment. For a long time, laser was usually used in special environments such as laboratories and factories, and thus has little impact on the safety of public environment. However, it is easier to obtain various mini-laser devices at present. The influence of laser on the safety of public environment, such as traffic safety, is receiving more and more attention.

By now, many types, such as absorbing-, reflecting-, nonlinear-absorbing- and optical-multiplexing types, of laser protective devices have been developed and applied. However, these devices still have many defects, such as complicated manufacturing process, limited protection angle, inability to perform refit on the basis of existing equipment and the like.

SUMMARY

Regarding the defects of the prior art, one of the technical problems to be solved by the present disclosure is to provide a dye-doped laser protective film. The laser protective film of the present disclosure has a simple manufacturing process, a large protection angle and good flexibility, and can refit existing devices. Therefore, the laser protective film of the present disclosure has a good application prospect in many technical fields such as laser goggles, window films and the like.

The technical solutions adopted by the present disclosure are as follow.

According to one aspect of the present disclosure, a dye-doped laser protective film is provided. The dye-doped laser protective film may comprise a polymer layer A and a polymer layer B which are sequentially arranged, wherein the polymer layer A may comprise a dye and a polymer I having a molecular arrangement of a left-handed helical structure; and the polymer layer B may comprise a dye and a polymer II having a molecular arrangement of a right-handed helical structure.

Preferably, the dye may be a positive dichroic dye.

Preferably, the polymer layer A may be obtained by the polymerization of a mixture A which may include polymerizable monomer, a left-handed chiral dopant, a photoinitiator, a polymerization inhibitor and a dye, under ultraviolet light. The polymer layer B may be obtained by the polymerization of a mixture B which may include polymerizable monomer, a right-handed chiral dopant, a photoinitiator, a polymerization inhibitor and a dye, under ultraviolet light.

Preferably, the mixture A may include, as percent by weight, 82.48-92.495 parts by mass of polymerizable monomer, 6-12 parts by mass of the left-handed chiral dopant, 1-3 parts by mass of the photoinitiator, 0.005-0.02 parts by mass of the polymerization inhibitor, and 0.5-2.5 parts by mass of the dye. Further, the mixture B may include 82.48-92.495 parts by mass of the polymerizable monomer, 6-12 parts by mass of the right-handed chiral dopant, 1-3 parts by mass of the photoinitiator, 0.005-0.02 parts by mass of the polymerization inhibitor, and 0.5-2.5 parts by mass of the dye.

Further, the polymerizable monomer may be at least one selected from a group consisting of HCM008, HCM009, and HCM020.

Further, the left-handed chiral dopant may be one selected from a group consisting of S1011 and S811, and the right-handed chiral dopant may be one selected from a group consisting of R1011 and R811.

Further, the photoinitiator may be one selected from a group consisting of Irgacure®819 and Irgacure®651.

Further, the polymerization inhibitor may be one selected from a group consisting of Tinuvin®328 and o-methylhydroquinone.

Preferably, the thickness of the polymer layer A may be 10 to 50 μm, and the thickness of the polymer layer B may be 10 to 50 μm.

Further, the absorption band of the dye may be the same as the reflection band of the polymers I and/or II, which can increase the protection angles of the polymer layers A and B for laser, and further increase the optical densities of the polymer layers A and B.

The present disclosure has the following advantages.

A cholesteric crystal structure can reflect circularly polarized light, and include left-handed helical- and right-handed helical structures. The crystal having the left-handed helical structure can reflect left-handed polarized light, and a crystal having the right-handed helical structure can reflect right-handed polarized light. On this basis, the complete reflection of the circularly polarized light can be achieved by combining the crystal having the left-handed helical structure and the crystal having the right-handed helical structure.

The present disclosure provides a dye-doped laser protective film, which includes a polymer layer A and a polymer layer B. Wherein, the polymer molecules of the polymer layer A are arranged as a left-handed helical structure and can reflect left-handed polarized laser, and the polymer molecules of the polymer layer B are arranged as a right-handed helical structure and can reflect right-handed polarized laser. Thus, the complete reflection of the circularly polarized light can be achieved by combining the polymer layer having the left-handed helical structure and the polymer layer having the right-handed helical structure.

In addition, the dye can absorb incident laser, thereby expanding the protection angle of the laser protective film.

Further, the dye-doped laser protective film of the present disclosure has a simple manufacturing process, a large protection angle and good flexibility, and can refit existing devices. The dye-doped laser protective film of the present disclosure has a good application prospect in many fields such as laser goggles, window films and the like.

DETAILED DESCRIPTION

Hereinafter, with reference to the embodiments, the concept and the technical effects of the present disclosure would be clearly and completely described to fully understand the objects, features and effects of the present disclosure. It is apparent that the described embodiments are only a part, but not all, of the embodiments of the present disclosure. Based on the embodiments of the present disclosure, other embodiments can be obtained by those skilled in the art without creative efforts and belong to the scope of protection of the present disclosure.

Example 1

In a yellow light environment, 15 parts by mass of an achiral polymerizable monomer HCM008, 59 parts by mass of an achiral polymerizable monomer HCM009, 14.36 parts by mass of an achiral polymerizable monomer HCM020, 8.83 parts by mass of a left-handed chiral dopant S1011, 1.85 parts by mass of photoinitiator Irgacure®819, 0.01 part by mass of a polymerization inhibitor Tinuvin®328, and 1 part by mass of a positive dichroic dye D1 were taken and put in a brown bottle. 4 mL of dichloromethane was added and stirred at normal temperature for 30 min, and then heated at 80° C. for 3 h to evaporate the dichloromethane completely, resulting in a mixture A.

15 parts by mass of an achiral polymerizable monomer HCM008, 59 parts by mass of an achiral polymerizable monomer HCM009, 14.36 parts by mass of HCM020, 8.83 parts by mass of a right-handed chiral dopant R1011, 1.85 parts by mass of a photoinitiator Irgacure®819, 0.01 part by mass of polymerization inhibitor Tinuvin®328 and 1 part by mass of a positive dichroic dye were taken and put in a brown bottle. 4 mL of dichloromethane was added and stirred at normal temperature for 30 min, and then heated at 80° C. for 3 h to evaporate the dichloromethane completely, resulting in a mixture B.

For the above compounds, the achiral polymerizable monomer HCM008 (purchased from Jiangsu Hecheng Display Technology Co., Ltd.) had a structural formula of

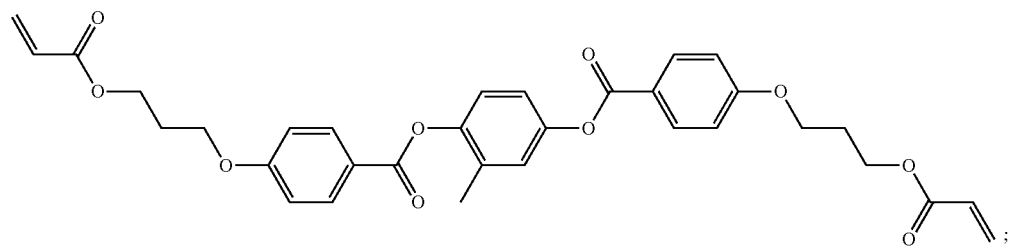 [SMILES: C=CC(=O)OCCCOc1ccc(C(=O)Oc2ccc(OC(=O)c3ccc(OCCCOC(=O)C=C)cc3)c(C)c2)cc1]

the achiral polymerizable monomer HCM009 (purchased from Jiangsu Hecheng Display Technology Co., Ltd.) had a structural formula of

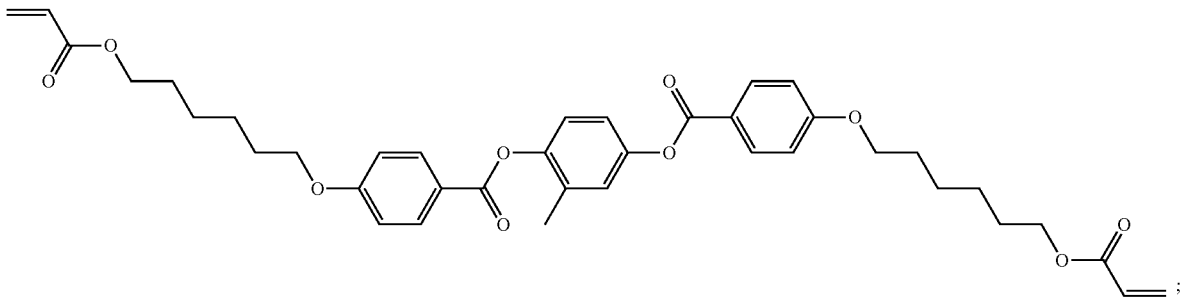 [SMILES: C=CC(=O)OCCCCCCOc1ccc(C(=O)Oc2ccc(OC(=O)c3ccc(OCCCCCCOC(=O)C=C)cc3)c(C)c2)cc1]

the achiral polymerizable monomer HCM020 (purchased from Jiangsu Hecheng Display Technology Co., Ltd.) had a structural formula of

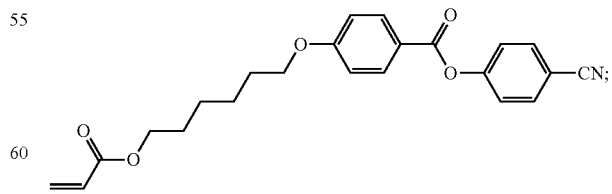

the left-handed chiral dopant S1011 (purchased from Beijing Bayi Space LCD Technology Co., Ltd.) had a structural formula of

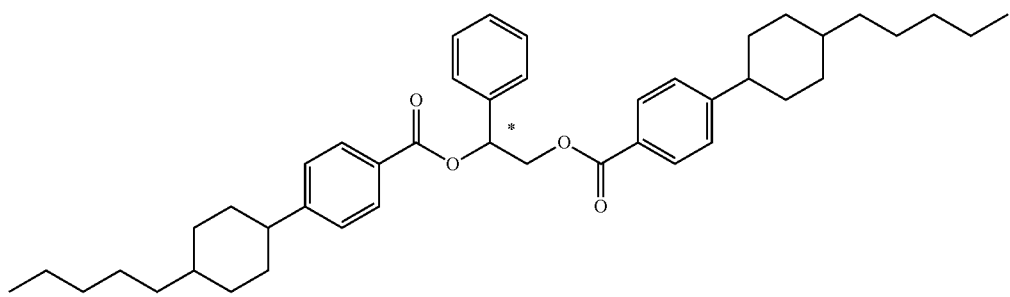
the right-handed chiral dopant R1011 (purchased from Beijing Bayi Space LCD Technology Co., Ltd.) had a structural formula of
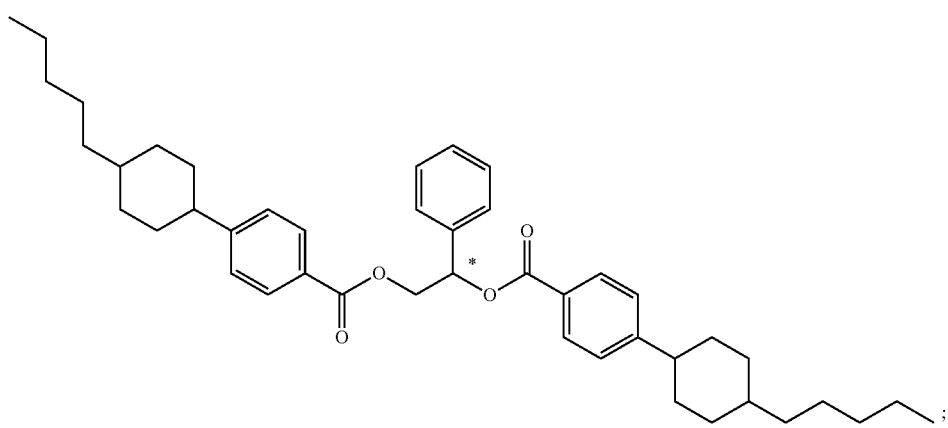 [SMILES: CCCCCC1CCC(c2ccc(C(=O)OCC(OC(=O)c3ccc(C4CCC(CCCCC)CC4)cc3)c3ccccc3)cc2)CC1]
the photoinitiator Irgacure®819 (purchased from Heowns) had a structural formula of
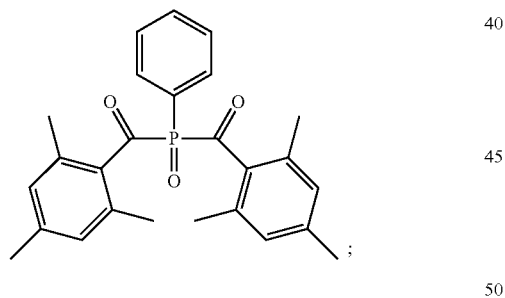
the polymerization inhibitor Tinuvin®328 (purchased from Heowns) had a structural formula of
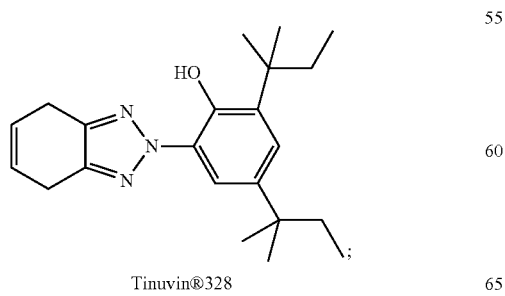
Tinuvin®328 the positive dichroic dye D1 had a structural formula of

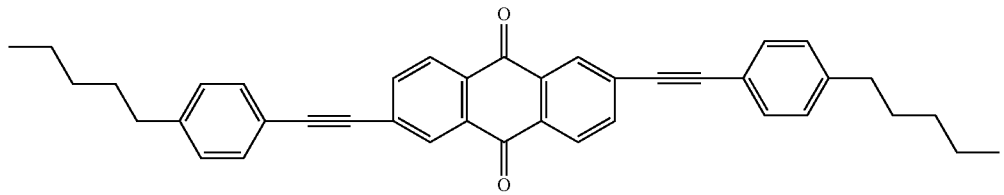

Figure 1:
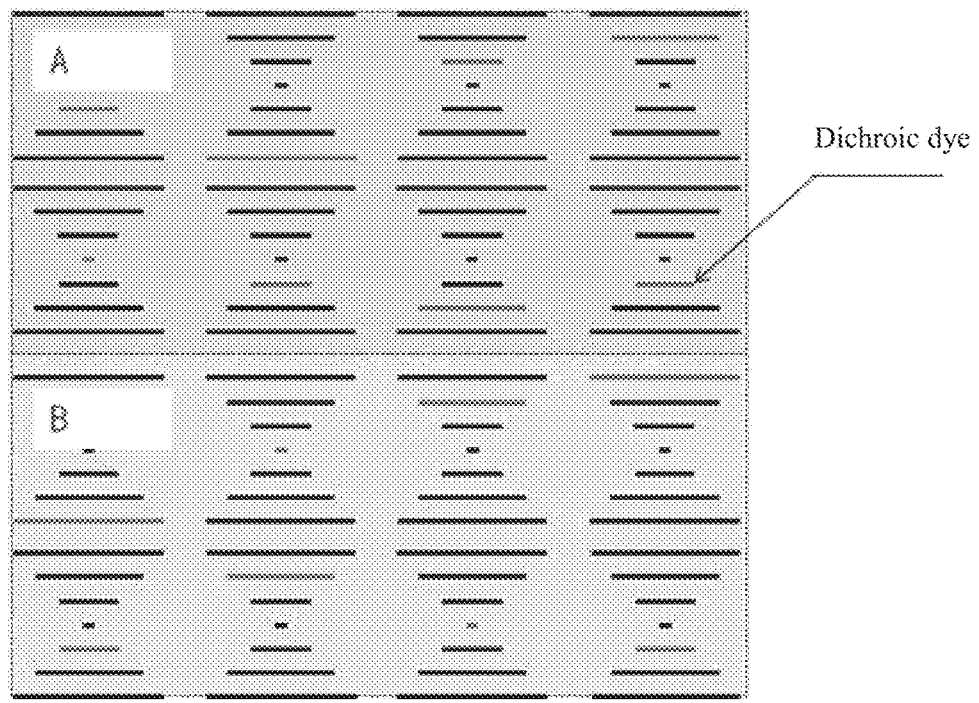
FIG. 1 shows a dye-doped laser protective film according to the present disclosure.

In the yellow light environment, the mixture A, the mixture B, a blade-coating bar and a clean substrate were taken and heated to 80° C. The mixture B was coated on the substrate by means of the blade-coating bar, resulting in the coated mixture B having a thickness of 25 μm. After cooling to 40° C., the mixture B was cured with a 200 W of ultraviolet light for 15 min, to form a polymer layer B. Then, the polymer layer B was heated to 80° C. and coated with the mixture A of a thickness of 25 μm by means of the blade-coating bar. After cooling to 40° C., the mixture A was cured with the 200 W of ultraviolet light for 15 min, to form a polymer layer A. FIG. 1 shows a schematic diagram of the obtained dye-doped laser protective film.

With the illumination of ultraviolet light, the photoinitiator can initiate the free polymerization of the polymerizable monomers to form polymer. In the polymer layer B, the molecules of the polymers, which were formed by the polymerization of the polymerizable monomers with the right-handed chiral dopant R1011, were arranged in a right-handed helical structure. It made the molecules of the dye arrange in the same way as that of the molecules of the polymers. Thus, the obtained polymer layer B could emit right-handed polarized laser.

In the polymer layer A, the molecules of the polymers, which were formed by the polymerization of the polymerizable monomers with the left-handed chiral dopant S1011, were arranged in a left-handed helical structure. It made the molecules of the dye arrange in the same way as that of the molecules of the polymer. Thus, the obtained polymer layer A could emit left-handed polarized laser.

When the concentration of a chiral dopant in a mixture is different, the location of the reflection peak of the polymer layer formed by the polymerization of the mixture would be different, according to formulae $\lambda = P \times n$ and $P = 1/HTP \times C$, in which $\lambda$ is a wavelength of a reflection peak, P is a pitch, n is an average refractive index of materials, HTP is helical twisting capacity of cholesteric liquid crystal, and C is concentration of the chiral dopant. Thus, the locations of the reflection peaks of the polymer layers A and B can be changed by changing the concentrations of the chiral dopants in the mixtures.

Figure 2:
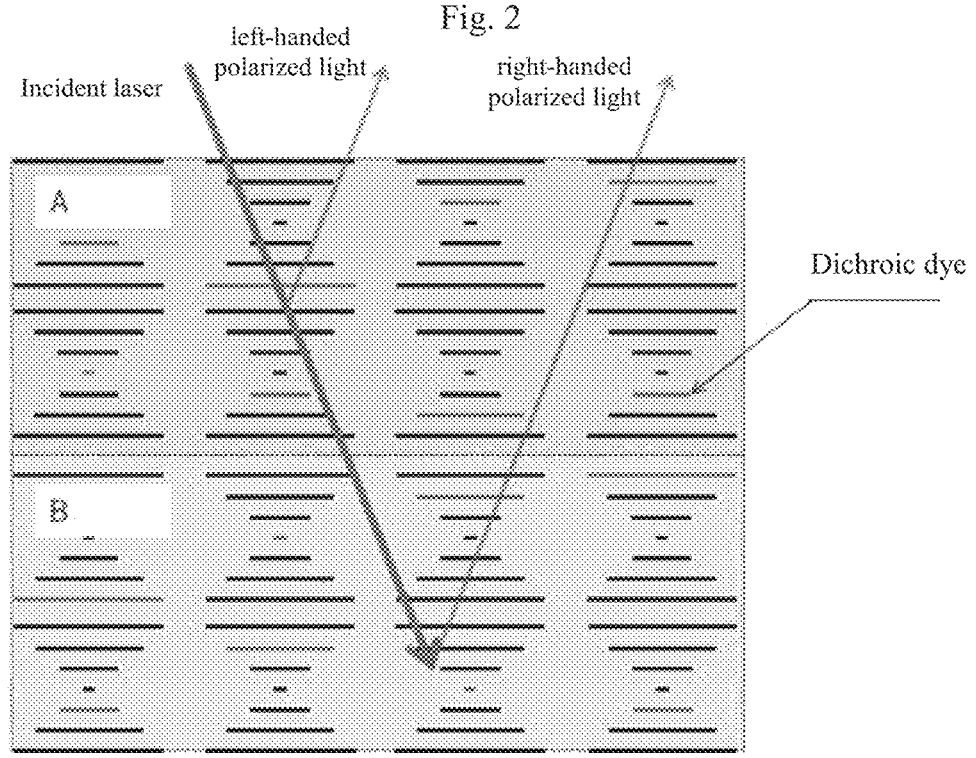
FIG. 2 shows a dye-doped laser protective film according to the present disclosure which is illuminated by laser.

Referring to FIG. 2, in the dye-doped laser protective film of the present disclosure, the polymer layer A can reflect left-handed polarized laser and the polymer layer B can reflect right-handed polarized laser under the illumination of laser, thereby completely reflecting the laser. Meantime, the doped dye can absorb laser within a specific waveband. Thus, the protection angle of the laser can be increased. The light absorption coefficient of the dye is related to the incident angle of incident light. The dye would have a maximum light absorption coefficient, when the incident direction of the incident light is parallel to the long axis of the molecules of the dye. The absorption wavebands of the dye are preferably the same as the reflection wavebands of the polymers I and/or II, which is favorable for the complete reflection of the laser.

The dye-doped laser protective film of the present disclosure has a simple manufacturing process, a large protection angle and good flexibility, and can refit existing devices. Thus, the dye-doped laser protective film has a good application prospect in many fields such as laser goggles, window films and the like.

Example 2

In a yellow light environment, 15 parts by mass of an achiral polymerizable monomer HCM008, 59 parts by mass of an achiral polymerizable monomer HCM009, 14.36 parts by mass of an achiral polymerizable monomer HCM020, 8.83 parts by mass of a left-handed chiral dopant S1011, 1.85 parts by mass of a photoinitiator Irgacure®819, 0.01 part by mass of a polymerization inhibitor Tinuvin®328 and 1 part by mass of a positive dichroic dye D1 which was the same as that in Example 1, were taken and put in a brown bottle. 4 mL of dichloromethane was added and stirred at normal temperature for 30 min, and then heated at 80° C. for 3 h to evaporate the dichloromethane completely, resulting in a mixture A.

15 parts by mass of an achiral polymerizable monomer HCM008, 59 parts by mass of an achiral polymerizable monomer HCM009, 14.36 parts by mass of HCM020, 8.83 parts by mass of a right-handed chiral dopant R1011, 1.85 parts by mass of a photoinitiator Irgacure®819, 0.01 part by mass of a polymerization inhibitor Tinuvin®328 and 1 part by mass of a positive dichroic dye which was the same as that in Example 1, were taken and put in a brown bottle. 4 mL of dichloromethane was added and stirred at normal temperature for 30 min, and then heated at 80° C. for 3 h to evaporate the dichloromethane completely, resulting in a mixture B.

In the yellow light environment, the mixture A, the mixture B, a blade-coating bar and a clean substrate were taken and heated to 80° C. The mixture A was coated on the substrate by means of the blade-coating bar, resulting in the coated mixture A having a thickness of 25 μm. After cooling to 40° C., the mixture A was cured with a 200 W of ultraviolet light for 15 min, to form a polymer layer A. Then, the polymer layer A was heated to 80° C. and coated with the mixture B of a thickness of 25 μm by means of the blade coating bar. After cooling to 40° C., the mixture B was cured with the 200 W of ultraviolet light for 15 min to form a polymer layer B, resulting in a dye-doped laser protective film.

Example 3

This example provides a dye-doped laser protective film, including a polymer layer A and a polymer layer B which are sequentially arranged.

The polymer layer A was formed by, under ultraviolet light, the curing of a mixture A which included 15 parts by mass of an achiral polymerizable monomer HCM008, 59 parts by mass of an achiral polymerizable monomer HCM009, 14.36 parts by mass of an achiral polymerizable monomer HCM020, 8.83 parts by mass of a left-handed chiral dopant S1011, 1.85 parts by mass of a photoinitiator Irgacure®819, 0.01 part by mass of a polymerization inhibitor Tinuvin®328 and 1 part by mass of a positive dichroic dye D1. The polymerizable monomers, the left-handed chiral dopant, the photoinitiator and the polymerization inhibitor were polymerized under the ultraviolet light to form a polymer I. The molecules of the polymer I were arranged in a left-handed helical structure. It made the molecules of the dye arrange in the same way as that of the molecules of the polymer I.

The polymer layer B was formed by, under ultraviolet light, the curing of a mixture B which included 15 parts by mass of an achiral polymerizable monomer HCM008, 59 parts by mass of an achiral polymerizable monomer HCM009, 14.36 parts by mass of HCM020, 8.83 parts by mass of a right-handed chiral dopant R1011, 1.85 parts by mass of a photoinitiator Irgacure®819, 0.01 part by mass of a polymerization inhibitor Tinuvin®328 and 1 part by mass of a positive dichroic dye. The polymerizable monomers, the right-handed chiral dopant, the photoinitiator and the polymerization inhibitor were polymerized under the ultraviolet light to form a polymer II. The molecules of the polymer II were arranged in a right-handed helical structure. It made the molecules of the dye arrange in the same way as that of the molecules of the polymer II.

Example 4

This example provides a dye-doped laser protective film, including a polymer layer A and a polymer layer B which are sequentially disposed.

The polymer layer A was formed by, under ultraviolet light, the curing of a mixture A which included 20 parts by mass of an achiral polymerizable monomer HCM008, 38 parts by mass of an achiral polymerizable monomer HCM009, 25 parts by mass of an achiral polymerizable monomer HCM020, 12 parts by mass of a left-handed chiral dopant S1011, 3 parts by mass of a photoinitiator Irgacure®819, 0.005 part by mass of a polymerization inhibitor Tinuvin®328 and 2.5 parts by mass of a positive dichroic dye D1.

The polymer layer B was formed by, under ultraviolet light, the curing of a mixture B which included 5 parts by mass of an achiral polymerizable monomer HCM008, 70 parts by mass of an achiral polymerizable monomer HCM009, 17 parts by mass of HCM020, 6 parts by mass of a right-handed chiral dopant R1011, 1 part by mass of a photoinitiator Irgacure®819, 0.02 part by mass of a polymerization inhibitor Tinuvin®328 and 0.98 part by mass of a positive dichroic dye.

Example 5

This example provides a dye-doped laser protective film, including a polymer layer A and a polymer layer B which are sequentially disposed.

The polymer layer A was formed by, under ultraviolet light, the curing of a mixture A which included 5 parts by mass of an achiral polymerizable monomer HCM008, 70 parts by mass of an achiral polymerizable monomer HCM009, 17 parts by mass of an achiral polymerizable monomer HCM020, 6 parts by mass of a left-handed chiral dopant S1011, 1 part by mass of a photoinitiator Irgacure®819, 0.02 part by mass of a polymerization inhibitor Tinuvin®328 and 0.98 part by mass of a positive dichroic dye D1.

The polymer layer B was formed by, under ultraviolet light, the curing of a mixture B which included 20 parts by mass of an achiral polymerizable monomer HCM008, 38 parts by mass of an achiral polymerizable monomer HCM009, 25 parts by mass of HCM020, 12 parts by mass of a right-handed chiral dopant R1011, 3 parts by mass of a photoinitiator Irgacure®819, 0.005 part by mass of a polymerization inhibitor o-methylhydroquinone and 0.5 part by mass of a positive dichroic dye.

Example 6

This example provides a dye-doped laser protective film, including a polymer layer A and a polymer layer B which are sequentially disposed.

The polymer layer A was formed by, under ultraviolet light, the curing of a mixture A which included 17 parts by mass of an achiral polymerizable monomer HCM008, 70 parts by mass of an achiral polymerizable monomer HCM009, 5 parts by mass of an achiral polymerizable monomer HCM021, 6 parts by mass of a left-handed chiral dopant S811, 1.48 parts by mass of a photoinitiator Irgacure®819, 0.02 part by mass of a polymerization inhibitor Tinuvin®328 and 0.5 part by mass of a positive dichroic dye D1. Left-handed chiral dopant S811 having a structural formula of

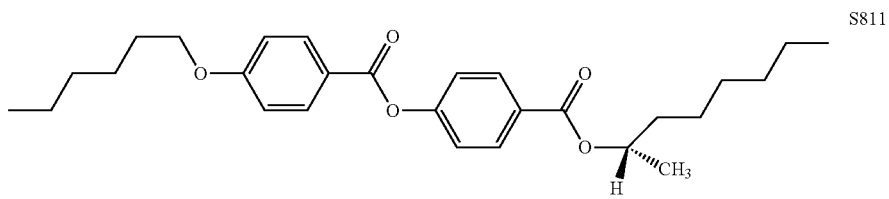 [SMILES: CCCCCCOc1ccc(C(=O)Oc2ccc(C(=O)O[C@@H](C)CCCCCC)cc2)cc1]

The polymer layer B was formed by, under ultraviolet light, the curing of a mixture B which included 13.48 parts by mass of an achiral polymerizable monomer HCM008, 70 parts by mass of an achiral polymerizable monomer HCM009, 5 parts by mass of HCM020, 6 parts by mass of a right-handed chiral dopant R811, 3 parts by mass of a photoinitiator Irgacure®651, 0.02 part by mass of a polymerization inhibitor Tinuvin®328 and 2.5 parts by mass of a positive dichroic dye. Right-handed chiral dopant R811 having a structural formula of

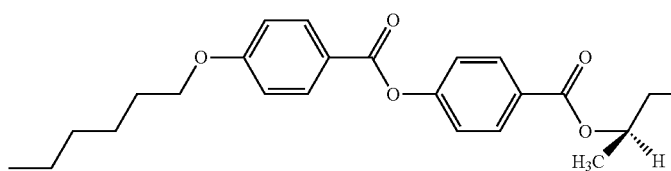

R811; and

Irgacure®651 having a structural formula of

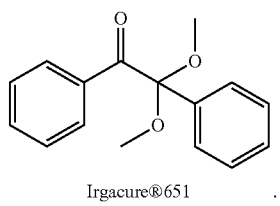 [SMILES: COC(OC)(C(=O)c1ccccc1)c1ccccc1]

Irgacure®651 .

What is claimed is:

1. A dye-doped laser protective film, comprising:
a polymer layer A; and
a polymer layer B which are sequentially disposed,
where the polymer layer A comprises a polymer I and a dye, and molecules of the polymer I are arranged in a left-handed helical structure,
where the polymer layer B comprises a polymer II and a dye, and molecules of the polymer II are arranged in a right-handed helical structure
wherein the dye is a positive dichroic dye, wherein an absorption band of the dye is the same as reflection band(s) of the polymer I and/or the polymer II;
wherein the polymer layer A is formed by, under ultraviolet light, polymerization of a mixture A which comprises:
   82.48 to 92.495 parts by mass of a polymerizable monomer;
   6 to 12 parts by mass of a left-handed chiral dopant;
   1 to 3 parts by mass of a photoinitiator;
   0.005 to 0.02 part by mass of a polymerization inhibitor; and
   0.5 to 2.5 parts by mass of a dye,
wherein the polymer layer B is formed by, under ultraviolet light, polymerization of a mixture B which comprises:
   82.48 to 92.495 parts by mass of a polymerizable monomer;
   6 to 12 parts by mass of a right-handed chiral dopant;
   1 to 3 parts by mass of a photoinitiator;
   0.005 to 0.02 part by mass of a polymerization inhibitor; and
   0.5 to 2.5 parts by mass of a dye.

2. The dye-doped laser protective film of claim 1, wherein the polymerizable monomer is at least one selected from a group consisting of achiral polymerizable monomer HCM008, achiral polymerizable monomer HCM009, achiral polymerizable monomer HCM020, and achiral polymerizable monomer HCM021.

3. The dye-doped laser protective film of claim 1, wherein the left-handed chiral dopant is one selected from a group consisting of left-handed chiral dopant S1011 and left-handed chiral dopant S811.

4. The dye-doped laser protective film of claim 1, wherein the photoinitiator is one selected from a group consisting of bis(2,4,6-trimethylbenzoyl)-phenylphosphineoxide and 2,2-dimethoxy-1,2-diphenylethan-1-one.

5. The dye-doped laser protective film of claim 1, wherein the polymerization inhibitor is one selected from a group consisting of 2-(2H-benzotriazol-2-yl)-4,6-ditertpentylphenol and o-methylhydroquinone.

6. The dye-doped laser protective film of claim 1, wherein the polymer layer A has a thickness of 10 to 50 μm.

7. The dye-doped laser protective film of claim 1, where the right-handed chiral dopant is one selected from a group consisting of right-handed chiral dopant R1011 and right-handed chiral dopant R811.

8. The dye-doped laser protective film according to of claim 1, wherein the polymer layer B has a thickness of 10 to 50 μm.

* * * * *